May 13, 1941.  H. W. MITCHELL  2,241,731

HIGH POTENTIAL TRANSFORMER TESTING MEANS

Filed Oct. 5, 1939

Inventor:
Henry Walter Mitchell

Patented May 13, 1941

2,241,731

UNITED STATES PATENT OFFICE 2,241,731

HIGH POTENTIAL TRANSFORMER TESTING MEANS

Henry Walter Mitchell, Waukegan, Ill., assignor of one-half to Warner-Patterson Company, Chicago, Ill., a corporation of Illinois Application October 5, 1939, Serial No. 298,002

9 Claims. (Cl. 175—183)

The present invention relates to high potential transformer testing means, and is more particularly directed to improved means of testing high potentials, especially those generated by an internal combustion engine ignition coil and parts associated therewith.

In order to obtain the highest efficiency of an engine, the ignition system, such as the coil, distributor contact points, the battery, condenser and the electrical connections must be in perfect condition.

My improved testing means is arranged in a small and compact manner, and is preferably in the form of a portable instrument and has a thermocouple spark gap and a gaseous tube therein, which are adapted to be applied to inspect the ignition system of an engine by connecting the thermocouple spark gap with the coil and distributor and by connecting the gaseous tube with the ignition points.

It is an object of the present invention to provide an instrument which is capable of detecting the throw-off in efficiency of the ignition system, which may be due to poor contact point surfaces, improper dwell period of the points, low battery voltage, poor condenser or shorted primary or secondary of the coil or transformer under test.

Another object of the invention is the provision of means to discharge the secondary of an ignition coil or transformer through a spark gap having one terminal thereof arranged as the hot junction of a thermocouple and the electromotive force generated by the heat of the spark to be indicated on a meter.

The thermocouple of the instrument is electrically connected with an indicating meter and is arranged to be connected in series with the secondary circuit of the electrical system and the gaseous tube of the instrument is connected in parallel with the ignition points of the electrical system.

As the electromotive force is always in direct proportion to the output milliamperage of the coil or transformer, a new method is herewith disclosed for determining the efficiency of the coil or transformer under test.

When the instrument is connected to the ignition system, and a drop in the efficiency occurs due to any of the above causes, it will result in both a lower oscillatory wave form on the primary or gaseous tube circuit, which, if carefully proportioned, will result in either the gaseous tube not lighting at all or lighting intermittently and spasmodically. The output or secondary side of the induction coil is also critically dependent upon the primary input side, and should discrepancies exist in the primary input side of the coil, these discrepancies will show up in lower heat value of the output secondary side and a weaker spark will exist across the thermocouple.

As the instrument is connected to the ignition system as above described with the thermocouple and indicating meter connected in series with the secondary side of the system and the gaseous tube connected in parallel with the ignition points or primary side of the system, it will be noted that should a relatively low heat value be indicated on the meter, careful inspection of the gaseous tube will indicate whether this result is caused by inefficient primary condition of the coil or whether the trouble is due to secondary internal insulation break-down.

Should the thermocouple output as registered on the meter read below a predetermined value, a close investigation should follow in order to determine just what has caused the ignition spark to lose heat or milliamperage, and upon investigation, may be found to be caused by any of the following conditions; poor primary connections, a faulty condenser, badly adjusted or burned points, or low battery voltage.

The low tension gaseous tube will indicate the trouble that exists in the primary side of the system by flickering instead of showing a steady glow, as it is essentially a low ionizing device with electrodes arranged in close proximity with each other and in an atmosphere of a combination of inert gases, which makes the tube sensitive to voltages above 60 volts when tested alone, and when used in this instrument, the tube is in series with a low capacity condenser of approximately .00015 mfd. to accomplish two distinctive purposes; first, to allow better definition, as when a gaseous tube is in series with a condenser, both electrodes will glow due to the charge and discharge of the condenser; and, secondly, to allow the sensitivity to be varied in manufacture to a predetermined ionizing value.

Referring to the drawing:

Figure 1 is a face view of the instrument which forms the subject matter of the present invention.

Figure 2 is an enlarged rear view of Figure 1 with the back removed, and illustrating diagrammatically the wiring and the instrument as connected to the ignition system; and Figure 3 illustrates a diagrammatic view of a modified form in which a plurality of electrodes, each arranged as thermocouples in a spark gap, are employed, including a switch for selectively connecting the meter with one or the other of the electrodes.

The instrument comprises an elongated hollow case 10, in the preferred embodiment of which is mounted a meter 11, a thermocouple 12 and a gaseous tube 13. The meter 11 has a lead 14 extending from terminal 15 of the meter to a leg 16 of the thermocouple 12, and a lead 18 extends from the other leg 17 of the thermocouple to terminal 19 of the meter. A lead 20 extends from terminal 19 of the meter 11 to outwardly of the case 10 to be attached to the secondary side of the coil of the ignition system. The thermocouple 12 is provided with an adjustable screw 21 which coacts with the terminal formed by the legs 16 and 17 and has a lead 22 that extends outwardly of the case 10 to be attached to ground. When connected as above described, the instrument is then in a condition to check the secondary side or output of the ignition coil or transformer.

To check or test the primary or input side of the ignition coil or transformer, the gaseous tube 13 is connected in the ignition system. The gaseous tube 13 has a lead 23 that extends to a condenser 24 and a lead 25 extends from the condenser 24 outwardly of the case 10 to be connected to the movable ignition point. A lead 26 extends from the other terminal of the gaseous tube 13 through the case 10 to be grounded for completing the circuit to the gaseous tube.

In order to more clearly point out the operation of the device in connection with the ignition system, this system will be briefly described. The ignition coil 27 has a secondary or output side 28 and a primary or input side 29, both of which are connected to extend to the battery 30, and a lead 31 extends from the secondary or high tension side 28 of the coil to the distributor cap (not shown). A lead 32 extends from the primary side 29 of the coil to the contact arm 33 and contact point 34, and a lead 35 extends from lead 32 and has the usual ignition condenser 36, and a lead 37 extends from condenser 36 to the battery 30. A lead 38 extends from lead 37 to the fixed contact point 39 that coacts with contact point 34 of arm 33.

When the electrical system has a normal coil 27 with full voltage available, a good condenser 36 and ignition points 34—39 properly adjusted, an inductive surge of about 300 volts is available across the points 34—39 when they are opened. This is due to the induction of the coil 27 discharging into the condenser 36 which is across the points and results in a resonant combination with high current and potential.

The gaseous tube 13 of the instrument is of a sensitive nature and has the condenser 24 in series therewith to limit this sensitivity and allow the electrodes 13a and 13b of the gaseous tube 13 to glow as the condenser 24 offers the impedance to the flow of oscillatory current.

As the resonant frequency of an oscillatory circuit to which reference has been made, is the frequency to which the circuit gives maximum response, it has been found that the magnitude of the current flow is dependent upon the frequency, and since there is both a positive and negative terminal involving the frequency, it follows that at some particular frequency these two terminals will become equal and cancel out, which is termed the resonant frequency of the circuit. If, therefore, the resistance in the primary circuit indicated as A, is abnormally high, the gaseous tube 13 is not furnished sufficient current to ionize it, or if the initial battery voltage is below normal, a high inductive discharge is not possible, or if the ignition coil primary 29 is faulty, full value of the resonant oscillatory discharge is limited, which causes the gaseous tube 13 to ionize only occasionally or to flicker. The shunting of such a minute capacity across the distributor points 34—39 will have no perceptive effect upon the general action of the ignition system.

Should the gaseous tube 13 ionize regularly in a steady glow, it is certain that the loss does not exist in the low tension side of the coil, except in one instance, when the coil primary 29 is connected in opposite polarity, that is, one side of the secondary 28, which in all ignition coils is connected to one side of the primary 29, and the relation of this terminal to the ground is of utmost importance, so that when reversing these leads a better reading is obtained, it is obvious that the coil was improperly connected, as investigation has shown that about one out of thirty-five coils is found to be connected improperly, which results in a tremendous loss of energy. When the ignition coil is properly connected and the gaseous tube 13 glows regularly and the meter indicates a low heat value, the loss is definitely in the coil proper and the coil should be condemned and replaced.

The use of a thermocouple 12 as one terminal of the spark gap in the secondary circuit B, is as follows; when a junction formed by the legs 16—17 of two dissimilar metals is made, and this junction is heated, a potential is generated directly in proportion to the temperature differential of the cold and hot junction. The hot junction exposed to the spark under test receives considerable heat, and as the heat is converted into useful E. M. F. value which will cause the meter 11 to deflect in proportion to the heat of the spark which is always in proportion to the length of the spark gap, a preset spark gap may be established by adjusting screw 21. This gap should be in the neighborhood of five millimeters, which is the approximate resistance encountered by the spark when firing a spark plug in the ignition system having a gap of .025 of an inch at 180 pounds per square inch of pressure and at a temperature across the electrodes of the spark plug of 375 degrees Fahrenheit.

In the modified form, Figure 3, is illustrated a plurality of electrodes, each arranged as thermocouples in a spark gap and a switch for selectively connecting the meter with one or the other of the electrodes.

The electrodes each comprise a pair of legs 16a—17a and 40—41 which are arranged in pairs as thermocouples and in spaced relation to provide a spark gap 42 therebetween. A pair of leads 43—44 extend from legs 16a—17a of one electrode to contacts 45—46 of a switch 47 and leads 48—49 extend from legs 40—41 of the other electrode to the contacts 50—51 of the switch, and the meter indicated as 11a has a pair of leads 52—53 that extend to terminals 54—55 of the switch. Leads 22a and 31a serve to connect the instrument with the high tension side of the coil under test.

When the switch is operated to connect one or the other of the cathodes with the coil under test, it will in each instance connect the meter, and the reading of the meter 11a will determine whether the coil is properly connected in the system. The gaseous tube 13 may be employed in the modified form in the manner illustrated and described for the preferred embodiment.

The scale 56 of the meter 11 is laid out to show the apparent and approximate efficiency of the ignition coil or transformer under test and is visible through an opening 57 in the case 10. Relatively small openings 58 and 59 are also provided in the case 10 through which the spark of the thermocouple 12 and the glow of the gaseous tube 13, respectively, are visible. The case 10 is provided with a handle 60 for bodily carrying or supporting the instrument while making the tests.

I claim:

1. An electrical instrument comprising a thermocouple, a meter, said thermocouple and meter being adapted to be connected in series with the secondary circuit of an ignition system, said thermocouple being arranged as one terminal of a spark gap to receive the heat generated by the spark discharge of the system and to interpret this heat into terms of coil efficiency on said meter.

2. An electrical instrument comprising a thermocouple and a meter adapted to be connected in series with the secondary circuit of an ignition system, the thermocouple being arranged as one terminal of a spark gap to receive the heat generated by the spark discharge of the system and to interpret this heat into terms of coil efficiency on said meter.

3. An electrical testing instrument of the character described comprising a thermocouple arranged as an electrode in a spark gap of an electrical ignition circuit, a meter, said thermocouple discharging the potential generated into said meter for determining the heat of the spark.

4. An electrical testing instrument of the character described comprising a thermocouple, a meter, a gaseous tube, said thermocouple being arranged as an electrode in a spark gap of an ignition system to discharge the potential generated into the meter for determining the heat of the spark, said gaseous tube being arranged to be shunted across the low tension primary side of the ignition points of the ignition system for determining the peak values and resonant period of the low tension primary of the coil of the ignition system.

5. An electrical testing instrument of the character described comprising a thermocouple arranged as an electrode in a spark gap of an electrical ignition system, a meter for receiving the potential generated therein for indicating the heat of the spark of said thermocouple, and a gaseous tube shunted across the low tension primary side of the ignition points of the ignition system for determining the peak values and resonant period of the low tension primary of the ignition coil of the system.

6. An electrical testing instrument for testing an ignition system, comprising a thermocouple arranged as one terminal of a spark gap to receive the heat generated by the spark discharge of the system and to interpret this heat into terms of coil efficiency.

7. An electrical testing instrument having electrodes arranged as thermocouples in a spark gap of an electrical system, a meter including a switch for selectively connecting one or the other electrode thermocouples with the meter whereby the temperature of each spark gap terminal may be determined.

8. An electrical testing instrument having thermocouples arranged as a spark gap in the electrical system, a meter, a switch for selectively connecting the plus electrode thermocouple and the minus electrode thermocouple with said meter whereby the temperature differential of each of the thermocouples may be determined.

9. An electrical testing instrument having thermocouples and a meter adapted to be connected in series with the secondary side of the coil of an ignition system, said thermocouples being arranged as a spark gap in the electrical system, a switch selectively connecting either of the thermocouples of the spark gap with the meter for testing the terminal temperature of each spark gap electrode produced by the secondary side of the coil.

HENRY WALTER MITCHELL.